(12) United States Patent
Chandrashekar et al.

(10) Patent No.: US 10,248,679 B2
(45) Date of Patent: Apr. 2, 2019

(54) COLLISION DETECTION USING STATE MANAGEMENT OF CONFIGURATION ITEMS

(71) Applicant: ServiceNow, Inc., Santa Clara, CA (US)

(72) Inventors: Sridhar Chandrashekar, Sammamish, WA (US); Manish Gupta, Redmond, WA (US); Magesh Narayanan, Redmond, WA (US)

(73) Assignee: ServiceNow, Inc., Santa Clara, CA (US)

( * ) Notice: Subject to any disclaimer, the term of this patent is extended or adjusted under 35 U.S.C. 154(b) by 51 days.

(21) Appl. No.: 15/838,311

(22) Filed: Dec. 11, 2017

(65) Prior Publication Data

US 2018/0102942 A1 Apr. 12, 2018

Related U.S. Application Data

(63) Continuation of application No. 14/509,419, filed on Oct. 8, 2014, now Pat. No. 9,853,863.

(51) Int. Cl.
*G06F 17/30* (2006.01)
*H04L 12/24* (2006.01)
(Continued)

(52) U.S. Cl.
CPC ............ *G06F 17/3033* (2013.01); *G06F 7/08* (2013.01); *G06F 7/20* (2013.01); *G06F 9/5027* (2013.01); *G06F 17/30289* (2013.01); *G06F 17/30345* (2013.01); *G06F 17/30424* (2013.01); *G06F 17/30725* (2013.01); *G06F 17/30949* (2013.01); *H04L 41/0813* (2013.01); *H04L 41/0856* (2013.01); *H04L 41/0869* (2013.01)

(58) Field of Classification Search
CPC ......................... H04L 41/0813; G06F 17/3033
USPC .......................................................... 709/220
See application file for complete search history.

(56) References Cited

U.S. PATENT DOCUMENTS 6,788,702 B1 * 9/2004 Garcia-Luna-Aceves ...................
H04L 45/02
370/337
8,107,496 B2 * 1/2012 Borella .................. H04W 36/14
370/338
(Continued)

OTHER PUBLICATIONS

Barcelo et al., "CSMA with Enhanced Collision Avoidance: a Performance Assessment", 2009.*
(Continued)

*Primary Examiner* — Ondrej C Vostal
(74) *Attorney, Agent, or Firm* — Fletcher Yoder PC

(57) ABSTRACT

Implementations of a system, method and apparatus described herein receive, for a configuration item in a configuration management database, status indicating an operational state and an automation state associated with the configuration item, and determine whether a conflict will occur with at least one of the operational state or the automation state of the configuration item as a result of a process affecting the configuration item. When the conflict will not occur, a change is made to at least one of the operational state or the automation state of the configuration item in accordance with the process. Upon a conclusion of the process, the change is removed. If the conflict will occur, the process not allowed to continue.

20 Claims, 3 Drawing Sheets

(51) Int. Cl.
*G06F 7/08* (2006.01)
*G06F 7/20* (2006.01)
*G06F 9/50* (2006.01)

(56) References Cited

U.S. PATENT DOCUMENTS

| | | | | |
|---|---|---|---|---|
| 8,427,976 | B1* | 4/2013 | Dinan | H04W 36/0072 370/252 |
| 8,838,755 | B2* | 9/2014 | Sanghvi | H04L 41/0843 709/220 |
| 9,116,905 | B1* | 8/2015 | Harwood | G06F 11/3476 |
| 9,173,203 | B2* | 10/2015 | Susitaival | H04L 1/188 |
| 9,235,524 | B1* | 1/2016 | Derbeko | G06F 12/0866 |
| 9,276,715 | B2* | 3/2016 | Jeong | H04L 5/0035 |
| 9,811,808 | B2* | 11/2017 | Abuelsaad | G06Q 10/1095 |
| 2002/0154653 | A1* | 10/2002 | Benveniste | H04L 12/4013 370/447 |
| 2004/0006732 | A1* | 1/2004 | Lundby | H04L 1/0002 714/748 |
| 2005/0165916 | A1* | 7/2005 | Cromer | H04W 76/025 709/220 |
| 2006/0029073 | A1* | 2/2006 | Cervello | H04W 74/0816 370/389 |
| 2006/0245369 | A1* | 11/2006 | Schimmelpfeng | H04L 43/08 370/252 |
| 2007/0100712 | A1* | 5/2007 | Kilpatrick | G06Q 10/06 705/29 |
| 2007/0100892 | A1* | 5/2007 | Kephart | G06Q 10/06 |
| 2009/0133026 | A1* | 5/2009 | Aggarwal | G06F 9/4843 718/103 |
| 2010/0235585 | A1* | 9/2010 | Dowlatkhah | G06F 17/30566 711/136 |
| 2010/0318391 | A1* | 12/2010 | Gvirtsman | G06Q 10/06 705/7.39 |
| 2011/0010339 | A1* | 1/2011 | Wipfel | G06F 17/30067 707/610 |
| 2011/0196957 | A1* | 8/2011 | Ayachitula | G06Q 10/06 709/224 |
| 2011/0222409 | A1* | 9/2011 | Sun | H04W 72/1215 370/241 |
| 2011/0225575 | A1* | 9/2011 | Ningombam | G06F 8/65 717/170 |
| 2012/0265906 | A1* | 10/2012 | Carlson | G06F 9/4843 710/22 |
| 2013/0003678 | A1* | 1/2013 | Quan | H04W 72/04 370/329 |
| 2013/0005375 | A1* | 1/2013 | Chen | H04W 72/082 455/509 |
| 2013/0201316 | A1* | 8/2013 | Binder | H04L 67/12 348/77 |
| 2013/0242833 | A1* | 9/2013 | Ahn | H04W 72/082 370/311 |
| 2013/0272345 | A1* | 10/2013 | Furukawa | H01Q 3/24 375/211 |
| 2013/0294232 | A1* | 11/2013 | Segev | H04W 28/06 370/230 |
| 2014/0064124 | A1* | 3/2014 | Paladugu | H04W 76/028 370/252 |
| 2014/0094125 | A1* | 4/2014 | Behravan | H04W 24/02 455/63.1 |
| 2014/0120837 | A1* | 5/2014 | Abiri | H04W 16/14 455/41.2 |
| 2014/0133428 | A1* | 5/2014 | Kazmi | H04W 72/1289 370/329 |
| 2014/0140209 | A1* | 5/2014 | Shihada | H04L 43/0864 370/230 |
| 2014/0258367 | A1* | 9/2014 | Suryavanshi | H04L 65/1073 709/203 |
| 2014/0280268 | A1* | 9/2014 | McKay | G06F 17/30286 707/758 |
| 2014/0289333 | A1* | 9/2014 | Chan | A63F 13/12 709/204 |
| 2015/0066580 | A1* | 3/2015 | Bryant | G06Q 30/0201 705/7.29 |
| 2015/0220417 | A1* | 8/2015 | Diment | G06F 11/3438 709/224 |
| 2016/0092127 | A1* | 3/2016 | Markley | G06F 3/065 711/162 |

OTHER PUBLICATIONS

Cheng et al., "A Novel Collision Avoidance Algorithm for IEEE 802.11 Wireless LANs", 2014.*
Informaiton Networks, "CSMA/CA", 2005.*
Kim et al., "Performance Analysis of CSMA/CA (Carrier Sense Multiple Access with Collision Avoidance) Protocols for Wirelss Local Area Networks in Multipath and Shadowing Environments", 2002.*
Ma et al., "Dynamic Optimization of IEEE 802.11 CSMA/CA Based on the Number of Competing Stations", 2004.*
Scottish Qualifications Authority, "Carrier Sense Multiple Access Collision Avoidance (CSMA/CA)", 2007.*
Sebgui et al., "Improving CSMA/CA Network Performance Under Hidden Collision", 2016.*
Wu et al., "IEEE 802.11 Distributed Coordination Function (DCF): Analysis and Enhancement", 2002.*
Ziouva et al., "CSMA/CA Performance Under High Traffic Conditions: Throughput and Delay Analysis", 2001.*
Zuquete, "Improved CSMA/CA Protocol for IEEE 802.11", 2008.*

* cited by examiner

COLLISION DETECTION USING STATE MANAGEMENT OF CONFIGURATION ITEMS

CROSS REFERENCE TO RELATED APPLICATIONS

This application is a continuation of U.S. application Ser. No. 14/509,419, filed Oct. 8, 2014, the contents of which are herein expressly incorporated by reference for all purposes.

TECHNICAL FIELD

The present disclosure relates in general to techniques and devices for managing operational and automation states of configuration items in a configuration management database and for detecting conflicts or collisions in cloud automation and/or datacenter operations using real-time cloud infrastructure configuration item state management.

BACKGROUND

Cloud computing relates to the sharing of computing resources that are typically accessed via the Internet. A cloud computing infrastructure generally includes a large number of servers, such as application servers, web servers, and/or database servers, that are configured to execute various programs. The servers may be used to implement a configuration management database (CMDB). A CMDB can include a number of Configuration items (CI) each of which relates to an information technology asset.

BRIEF SUMMARY

This disclosure describes using the operational and automation states of CIs to determine whether a process to be performed that affects the CIs is possible. In one implementation of the teachings herein, an apparatus includes a memory and a processor. The processor is configured to execute instructions stored in the memory to receive, for a configuration item in a configuration management database, status indicating an operational state and an automation state associated with the configuration item, determine whether a conflict will occur with at least one of the operational state or the automation state of the configuration item as a result of a process affecting the configuration item, and, upon a condition that the conflict will not occur, make a change to at least one of the operational state or the automation state of the configuration item in accordance with the process and, upon a conclusion of the process, remove the change.

One method described herein includes receiving, for a configuration item in a configuration management database, status indicating an operational state and an automation state associated with the configuration item, determining whether a conflict will occur with at least one of the operational state or the automation state of the configuration item as a result of a process affecting the configuration item and, upon a condition that the conflict will not occur, making a change to at least one of the operational state or the automation state of the configuration item in accordance with the process and, upon a conclusion of the process, removing the change.

Details of and variations in these implementations, and other implementations, are described hereinafter.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
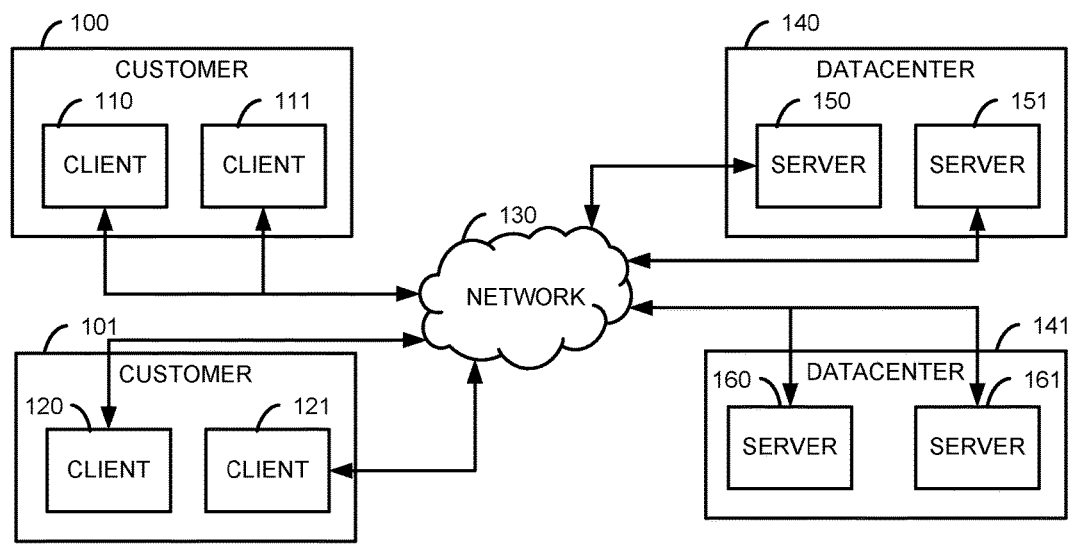
FIG. 1 is a schematic diagram of an cloud computing system in which the teachings may be implemented.

Cloud computing can provide various advantages over traditional computing models, including the ability to allocate shared resources amongst many different customers. Under traditional computing models, computing resources are typically allocated to a single customer or entity and substantial portions of those resources may remain unused or underused.

Computing resources of cloud computing infrastructure may be allocated, for example, using a multi-tenant or single-tenant architecture. Under a multi-tenant architecture, installations or instantiations of application, database, and/or other software application servers may be shared amongst multiple customers. For example, a single web server (e.g., a unitary Apache installation), application server (e.g., unitary Java Virtual Machine) and/or a single database server catalog (e.g., a unitary MySQL catalog) may handle requests from multiple customers. In a multi-tenant architecture, data or applications used by various customers can be commingled or shared. In an implementation of this architecture, the application and/or database server software can distinguish between and segregate data and other information of the various customers using the system. For example, database records belonging to a particular customer may be identified using a customer identifier field in a database table holding records for numerous customers.

Under a single-tenant infrastructure, separate web servers, application servers, and/or database servers are created for each customer. In other words, each customer will access its dedicated web server(s), will have its transactions processed using its dedicated application server(s), and will have its data stored in its dedicated database server(s) and or catalog(s). Physical hardware servers may be shared such that multiple installations or instantiations of web, application, and/or database servers may be installed on the same physical server. Each installation may be allocated a certain portion of the physical server resources, such as RAM, storage, and CPU cycles.

In an exemplary implementation, a customer instance is composed of four web server instances, four application server instances, and two database server instances. As previously described each of these server instances may be located on different physical servers and each of these server instances may share resources of the different physical servers with a number of other server instances associated with other customer instances. The web, application, and database servers of the customer instance can be allocated to two or more different datacenters to facilitate high availability of the applications and data provided by the servers. There may be a primary pair of web servers and application servers in a first datacenter and a backup pair of web servers and application servers in a second datacenter. There may be a primary database server in the first datacenter and a second database server in the second datacenter. The primary database server can replicate data to the secondary database server. The cloud computing infrastructure can be configured to direct traffic to the primary pair of web servers which can be configured to utilize the primary pair of application servers and primary database server respectively. In a failure scenario, the secondary servers may be converted to primary servers.

The application servers can include a platform application, such as one written in Java, for example, that provides generic platform functionality for accessing the database servers, integrating with external applications, and rendering web pages and other content to be transmitted to clients. The generic platform functionality may be configured with metadata stored in the database server. In other words, the operation of the platform on the application server may be customized by certain end-users of the platform without requiring the Java code of the platform application to be changed. The database server instances can be configured with a database configuration and schema to facilitate the operation of the platform. For example, the database server instance can be configured with various tables for storing metadata about applications, tables/fields, menus, forms, business rules, scripts, and custom user interface (UI) elements that are used to customize the appearance and operation of the customer instance. In some implementations, the application servers can include web server functionality and the web servers can be omitted.

In an alternative implementation, a customer instance may include only two application servers and one database server. In a given cloud infrastructure system, different implementations of customer instances may be used for different customer instances at the same time. Other configurations and implementations of customer instances may also be used.

Configuration items (CIs) represent components within a cloud computing infrastructure that are managed to deliver services to a customer. Configuration Items are stored within a CMDB located within the cloud computing infrastructure. For example, CIs may represent databases, applications, operating systems, servers and other types of computers, network components such as routers, firewalls and switches, communication devices such as telephones, storage devices, etc. CIs may also be instances of such components, for example, a web server instance, an application server instance, or a database server instance. CIs may be related or overlap. For example, one CI could be the customer instance described above. That customer instance CI is composed of four web server instances, four application server instances, and two database server instances, each of which may be its own CI. As is clear from the foregoing description, CIs may be hardware or software.

As part of managing a cloud computing infrastructure, a consistent manner of managing operational status and automation states (collectively referred to as operational and automation states or states) of each CI is desirable. Further, during scheduled maintenance on one or more CIs, a mechanism that suppresses monitoring alerts from those CI(s) is also desirable. In a single-tenant infrastructure including customer instances as described above, multiple automations or operations may be attempting simultaneous occurrence on the same set of CIs. Accordingly, it is also desirable to detect collisions between such operations.

The techniques and devices described herein relate to the consistent management of operational and automation states of CIs in a CMDB, and particularly to the inclusion of one or more state management application programming interfaces (APIs) that allow consistent management by users of both the operational and automation states of various CIs in a CMDB.

FIG. 1 is a schematic diagram of a cloud computing system. The cloud computing system can include two customers 100 and 101. Each customer 100, 101 may have clients, such as clients 110, 111 for customer 100 and clients 120, 121 for customer 101. Each of clients 110, 111, 120, 121 can be in the form of a computing system including multiple computing devices, or in the form of a single computing device, for example, a mobile phone, a tablet computer, a laptop computer, a notebook computer, a desktop computer, and the like. The customers and clients shown are exemplary, and a cloud computing system may have a different number of customers or clients or may have a different configuration of customers or clients. For example, there may be hundreds or thousands of customers and each customer may have any number of clients.

The cloud computing system can include two datacenters 140 and 141. Each datacenter 140, 141 may have servers, such as servers 150, 151 for datacenter 140 and servers 160, 161 for datacenter 141. Each datacenter 140, 141 may represent a facility in a different geographic location where servers are located. Each of servers 150, 151, 160, 161 can be in the form of a computing system including multiple computing devices, or in the form of a single computing device, for example, a desktop computer, a server computer and the like. The datacenters 140, 141 and servers 150, 151, 160, 161 shown are exemplary, and a cloud computing system may have a different number of datacenters and servers or may have a different configuration of datacenters and servers. For example, there may be tens of data centers and each data center may have hundreds or any number of servers.

Clients 110, 111, 120, 121 and servers 150, 151, 160, 161 may be configured to connect to network 130. The clients for a particular customer may connect to network 130 via a common connection point or different connection points. Network 130 can be, for example, the Internet. Network 130 can also be or include a local area network (LAN), wide area network (WAN), virtual private network (VPN), or any other means of transferring data between any of clients 110, 111, 120, 121 and servers 150, 151, 160, 161. Network 130, datacenters 140, 141, and/or blocks not shown may include network hardware such as routers, switches, load balancers, and/or other network devices.

Other implementations of the exemplary cloud computing system are also possible. For example, devices other than the clients and servers shown may be included in the system. In an implementation, one or more additional servers may operate as a cloud infrastructure control, from which servers and/or clients of the cloud infrastructure are monitored, controlled, and/or configured. For example, some or all of the techniques described herein may operate on said cloud infrastructure control servers. Alternatively or in addition, some or all of the techniques described herein may operate on servers such as servers 150, 151, 160, 161.

Figure 2:
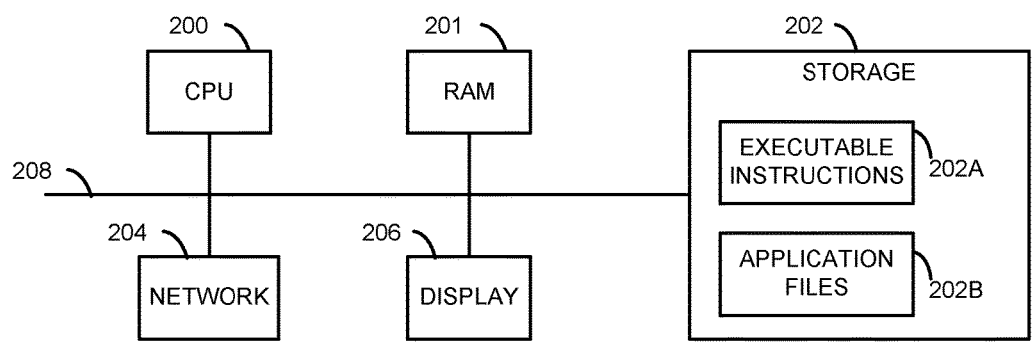
FIG. 2 is a block diagram of an example internal configuration of a client or server of a cloud computing system, such as the cloud computing system of FIG. 1.

FIG. 2 is a block diagram of an example internal configuration of a client or server of a cloud computing system. As previously described, clients or servers may take the form of a computing system including multiple computing devices, or in the form of a single computing device, for example, a mobile phone, a tablet computer, a laptop computer, a notebook computer, a desktop computer, a server computer and the like.

The internal configuration can include CPU 200, RAM 201, storage 202, network 204, display 206 and bus 208.

CPU 200 can be a conventional central processing unit. CPU 200 can include single or multiple processors each having single or multiple processing cores. Alternatively, CPU 200 can include another type of device, or multiple devices, capable of manipulating or processing information now-existing or hereafter developed.

RAM 201 can be Random Access Memory or any other suitable type of storage device can be used as memory. RAM 201 can include executable instructions and data for immediate access by CPU 200. RAM 201 typically comprises one or more DRAM modules such as DDR SDRAM. Alternatively, RAM 201 can include another type of device, or multiple devices, capable of storing data for processing by CPU 200 now-existing or hereafter developed. CPU 200 can access and manipulate data in RAM 201 via bus 208.

Storage 202 can include executable instructions 202A and application files 202B along with other data. The executable instructions 202A can include, for example, an operating system and one or more application programs for loading in whole or part into RAM 201 and to be executed by CPU 200. The operating system can be, for example, a Windows, Mac OS X, and/or Linux operating system. The application program can include, for example, a web browser, web server, and/or database server. Application files 202B can, for example, include user files, database catalogs, and configuration information. Storage 202 may comprise one or multiple devices and may utilize one or more types of storage, such as solid state or magnetic.

The internal configuration can also include one or more input/output devices, such as network 204 and display 206. Network 204 and display 206 can be coupled to CPU 200 via bus 208. Network 204 can, for example, provide a network interface to network 304 and may take the form of a wired network interface such as Ethernet or a wireless network interface. Other output devices that permit a user to program or otherwise use the client or server can be provided in addition to or as an alternative to display 206. When the output device is or includes a display, the display can be implemented in various ways, including by a liquid crystal display (LCD) or a cathode-ray tube (CRT) or light emitting diode (LED) display, such as an OLED display.

Other implementations of the internal architecture of clients and servers are also possible. For example, servers may omit display 206. The operations of CPU 200 can be distributed across multiple machines that can be coupled directly or across a local area or other network. RAM 201 or storage 202 can be distributed across multiple machines such as network-based memory or memory in multiple machines performing the operations of clients or servers. Although depicted here as a single bus, bus 208 can be composed of multiple buses.

A set of state management APIs may be provided that are accessible to each of the users or user teams that may be affecting and/or monitoring the CIs implementing each customer instance, including web service instance(s), application server instance(s) and database server instance(s). That is, for example, the set of state management APIs may be consumed by all cloud automations and by other cloud operations teams that might be affecting/monitoring the CIs. These set of state management APIs allows a consistent manner in which users can manage both the operational status and automation states of various CIs in the CMDB. State management APIs may be implemented on a client or server having a configuration as shown in FIG. 2.

Figure 3:
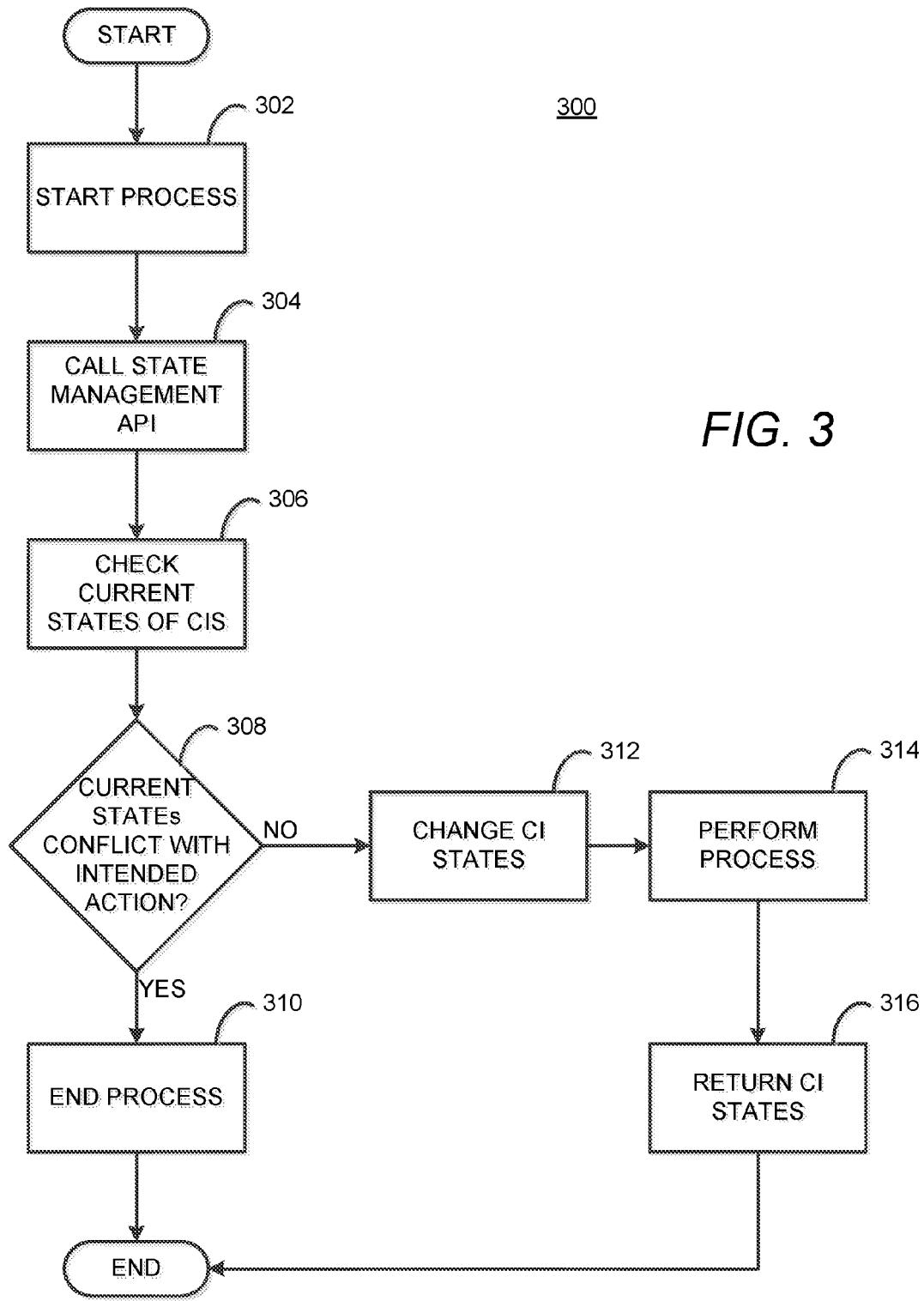
FIG. 3 is a flow chart diagram of a method according to the teachings herein.

The way in which the state management APIs may be implemented is described with further reference to FIG. 3.

Method or process 300 of FIG. 3 can be implemented in a system such as the client or server of FIG. 2. At least portions of process 300 can be implemented, for example, as a software program/application 202B that is executed thereby. The software program can include machine-readable instructions 202A that are stored in a memory such as storage 202 that, when executed by a processor such as CPU 202, cause the server to perform process 300. Process 300 can also be implemented using hardware in whole or in part. Some computing devices may have multiple memories and multiple processors, and the steps of process 300 may in such cases be distributed using different processors and memories. Use of the terms "processor" and "memory" in the singular herein encompasses computing devices that have only one processor or one memory as well as devices having multiple processors or memories that may each be used in the performance of some but not necessarily all recited steps.

For simplicity of explanation, process 300 is depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

At step 302, a process begins. For example, one process is a cloud automation, e.g., an automated operation comprising a series of steps, that accesses one or more CIs. Another operation could be a manual operation on one or more CIs. Before the process begins, a state management API is called at step 304. Desirably, the state management API is within an API layer above a CMDB.

At step 306, the state management API accesses the operational and automation states of one or more CIs that the process will affect. For example, the automation state of a CI may be one of the following: "Provisioning", "Cloning", "Instance Move", "Instance Rename", "Instance Retire", "AHA Transfer", "Patching", "Manual Maintenance", etc. Provisioning refers generally to a process of creating a new instance to allow it to provide (e.g., new) services to users or customers. Cloning refers to the duplication of an existing instance. Instance Move refers to moving an instance to a different server. Instance Rename refers to renaming the instance. Instance Retire refers to a scheduled process of retiring an instance due to, for example, the failure of or age of underlying hardware hosting the instance. AHA Transfer refers to a multi-step automated process that changes an instance to use a secondary set of servers, applications, or databases at another location in the event of a failover or scheduled maintenance. Patching refers to the application of changes to a running instance. Finally, Manual Maintenance refers to manual maintenance of an instance, such as manually modifying a database instance or hardware maintenance. Additional and/or different automation states are possible depending upon the application. For example, when the CI is a hardware device, such as a rack CI, "Manual Maintenance" is relevant but "Instance Retire" is not.

The operational status or state of a CI may be designated as one of following states: "operational", "non-operational", "repair-in-progress" or "retired". The operational status of a CI reflects the condition of the entity associated with the CI. These labels are by example only. Operational reflects that the entity is within normal operating parameters. Non-operational reflects an (e.g., temporary) error condition causing the entity to be unavailable. Repair-in-progress is generally a manual designation reflecting a current state that the entity is in repair. Retired reflects that an entity is obsolete and should not be accessed for new processes.

At step 308, the current states of step 306 are compared to the intended actions or operations of the process to determine if any conflicts exist. There are states and operations that are incompatible in that an intended operation could not or should not occur while a CI is in a particular state. Step 308 searches for these conflicts that would prevent the process from occurring in the intended way.

If there is a conflict, the process of step 302 ends in step 310 without performing any of its operations. Process 300 then ends. In contrast, if there is no conflict, process 300 proceeds to change the CI states at step 312 in accordance with the process of step 302. For example, if the process of step 302 is cloning, and assuming the operational status is "operational," the automation state is changed to "Cloning" for the CIs affected by the process of step 302. Thereafter, the one or more operations of the process of step 302 are performed at step 314. After the process of step 302 is completed at step 314, the CI states are returned to their original states at step 316. Process 300 then ends.

The process of step 302 may be one of a number of processes. For example, the process could include one of a number of cloud automations that, before entering its automation, calls one or more state management APIs and checks operational and automation states for the set of CIs that it is going to affect. If the current state of the CIs is going to conflict with the automation, then the automation will not continue. If there will be no conflict, the automation calls same set of APIs and accordingly sets the automation and/or operational states of the CIs. Just before exiting the automation, the states are reverted back to their original state.

Manual operations are also possible candidates for the process of step 302. For example, users in engineering and/or operations support may need to do manual operations on a CI. An API may be called by the user to check-out the relevant CIs in, for example, a service catalog. A service catalog can provide an interface that, for example, permits a user to search and/or browser for CIs and check out certain CIs for maintenance. First, however, state management APIs may be internally called to check the operational and automation states of the CIs and to ensure that the CIs are not already checked-out by another. If the CIs to be affected are not already checked-out by some automation/manual operation, then the user is allowed to continue with the check-out. Once the CIs are successfully checked out (e.g., resulting in an automation state of "repair-in-progress"), the user performs the necessary maintenance on the CIs and then checks back in the CIs.

In an implementation, the state management APIs may be accessed manually for a user to review the operational and automation states of CIs. The APIs may be programmed to either filter-in or filter-out monitoring alerts on the CIs based on their specific state. For example, an automation state of "repair-in-progress" may result in filtering out alerts for the affected CIs.

The state management APIs manage states at different relationship levels between CIs. For example, a router CI may be connected to more than one server CI. A process that affects one of the server CIs may not affect the router CI, but a process that affects the router CI may affect both server CIs. Users can optionally automatically manage states of related CIs.

Figure 4:
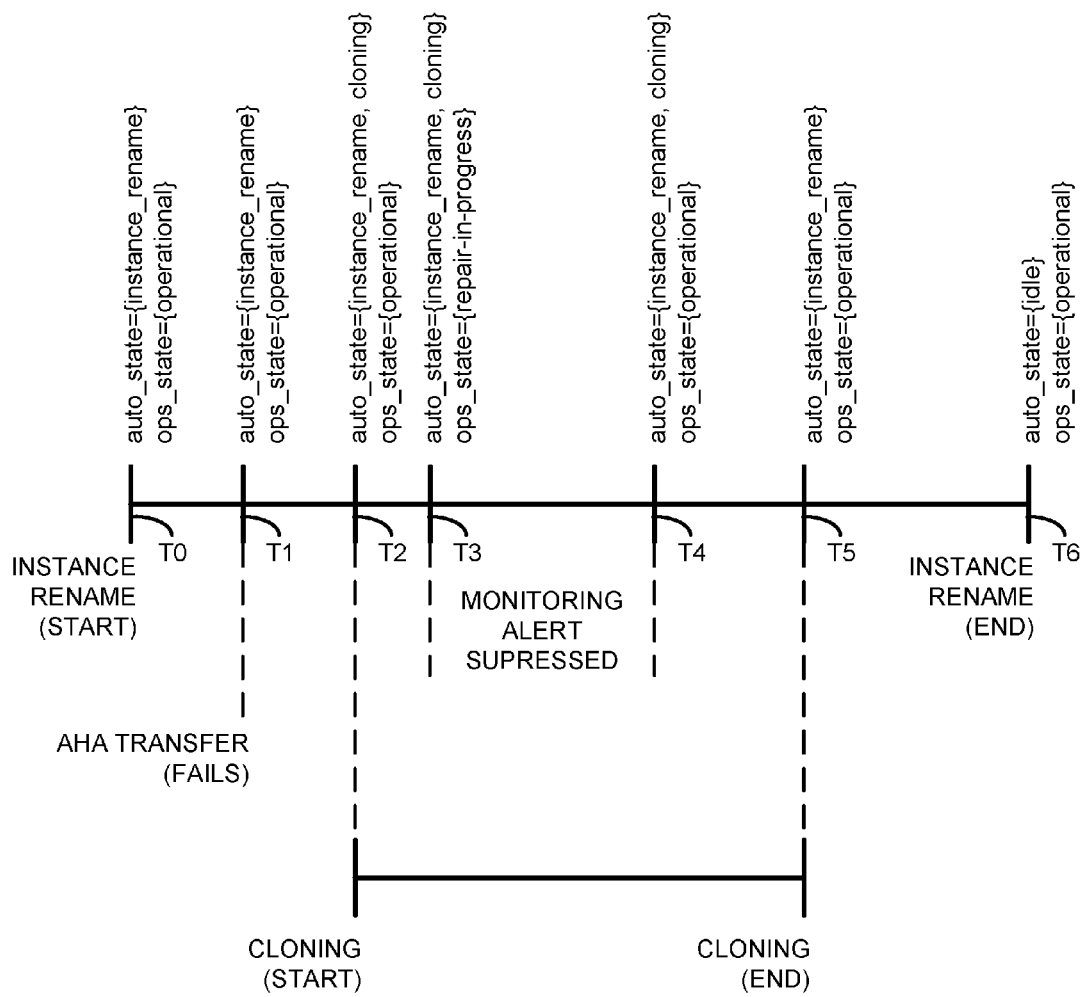
FIG. 4 is a timeline diagram of state management of a database server configuration item during an automation process.

FIG. 4 shows an example of state management timeline of a database server CI during automation processes—specifically renaming an instance ("InstanceRename"), performing an AHA transfer ("AHA Transfer") and cloning an instance ("Cloning"). In FIG. 4, "auto_state" represents the automation state of the database server CI, and "ops_state" represents the operational status of the database server C1.

At time T0, the automation "InstanceRename" starts. After confirming through the state management API associated with the database server CI that there is not present conflict, the operational status remains "operational" and the automation state is changed to "instance_rename." At time T1, the automation "AHA Transfer" is initiated. Through the state check using the state management API, it is determined that one or more operations associated with an AHA transfer conflict with the current states of the CI and more particularly with the automation state "instance_rename." Accordingly, the automation "AHA Transfer" fails. At time T2, the automation "Cloning" is initiated. Through the state check using the state management API, it is determined that one or more operations associated with cloning do not conflict with the current states. Accordingly, the automation state is updated to add "cloning" to the automation state "instance_rename," while the operational status remains "operational." The automation "Cloning" then proceeds as normal.

When next a user initiates a repair such as by accessing a service log API at time T3, the state management API is called. As demonstrated by FIG. 4, a CI can have more than one automation state. Thus, the check of the current states confirms whether or not a change of the operational status to "repair-in-progress" is compatible or conflicts with either automation state "instance_renmae" or automation state "cloning." Upon a determination that there is no conflict, the operational status of the database server CI is changed to "repair-in-progress." The automation states remain unchanged. A change of the operational status to "repair-in-progress" can be tied to an operation to suppress monitoring alerts for the database server CI. This is shown in FIG. 4 as "Monitoring Alert Suppressed" that ends at time T4, when the database server C1 is placed back into operation. Correspondingly, the operational status is returned to "operational." Again, the automation states remain unchanged.

At time T5, the automation "Cloning" ends. This results in the state management API reverting the automation state back to "instance_rename" by removing the automation state "cloning." When, at time T6 the automation "InstanceRename" ends, the state management API reverts the automation state to its original state before the start of the automation "InstanceRename." In this implementation, the automation state is set to "idle." The automation state "idle" means that there are no automation processes operating on the database server CI. The operational state remains unchanged.

While process 300 is described as running each time a change in the automation state or operational status is to occur, state management APIs could additionally be queried on a periodic basis. This could be used to detect, for example, a change to the operation status "non-operational" from the operation status "operational" that may not be tied to an automated process or user-planned activities.

As is clear from the foregoing description, a set of state management APIs are available depending upon the implementation of the invention. Certain state management API signatures are described below. These are examples and are not to be construed as exclusive or limiting of such signatures.

A) Signature: setCIOperationalState( )

The function of this API is to set the operational status of a CI and its parameters may include a requestor identifier, a system identifier of the CI and the operational status to be set for the CI. The requestor identifier could be the system identifier of the workflow context (i.e., an identifier of the automated process calling the state management API) or an identifier of an individual. The operational status may selected from one of those described above. This API may return true if the status is successfully set, false if not and an exception if an input is invalid.

B) Signature: restoreCIOperationalState( )

The function of this API is to restore the operational status of a CI. It is called at the end of a process, such as an automation process. Its parameters may include the requestor identifier and the system identifier of the CI described above. The operational status is not needed as a parameter as the status is restored to the status before setCIOperationalState( ) was called. This API may return true if the status is successfully restored, false if not and an exception if an input is invalid.

C) Signature: setBulkCIOperationalState( )

The function of this API is to set the operational status of a set (also called an array) of CIs. Its parameters may include a requestor identifier and the operational status to be set for the array of CIs similar to those described with respect to setCIOperationalState( ). The array or list of the system identifiers of the CIs is the final parameter in this example. This API may return true if the status is successfully set for all CIs within the array, false if not and an exception if an input is invalid.

D) Signature: restoreBulkCIOperationalState( )

This API is a companion to setBulkCIOperationalState( ) in that its function is to restore the operational status of the array of CIs whose status was changed by setBulkCIOperationalState( ). It is called at the end of a process, such as an automation process. Its parameters may include the requestor identifier and the system identifier of the array of CIs described above. The operational status is not needed as a parameter as the status is restored to the status before setBulkCIOperationalState( ) was called. This API may return true if the status is successfully restored for all CIs within the array, false if not and an exception if an input is invalid.

E) Signature: addCIAutomationState( )

The function of this API is to add an automation state to a CI and its parameters may include a requestor identifier and a system identifier of the CI similar to those described for the other APIs. Another parameter is the automation state to be added to the CI, which could be one of the automation states described previously. An optional parameter is a lease time (e.g., HH:MM:SS). Lease time sets the length of time for which the automation state should be identified with the CI when, for example, manual maintenance or another non-automated process is performed. This API may return true if the state is successfully added, false if not and an exception if an input is invalid.

F) Signature: removeCIAutomationState( )

This API is a companion to addCIAutomationState( ) and removes an automation state from a CI at the end of an automation process (also called an automation run). Its parameters may include the requestor identifier and the system identifier of the CI. The automation state is also used as a parameter as the CI may have more than one automation state assigned to it. This API may return true if the state is successfully removed, false if not and an exception if an input is invalid. This API may not be called when lease time is specified as the removal time for the automation state is defined when added to the CI with the parameter lease time.

G) Signature: addBulkCIAutomationState( )

This API adds an automation state to an array of CIs. In a similar manner to setBulkCIOperationalState( ) its parameters include a requestor identifier and the array or list of the system identifiers of the CIs. Another parameter is the automation state to be added. This API may return true if the state is successfully added for all CIs within the array, false if not and an exception if an input is invalid. Lease time, as described above with reference to addCIAutomationState( ), is an optional parameter.

H) Signature: removeBulkCIAutomationState( )

This API is a companion to addBulkCIAutomationState( ) and removes an automation state from an array of CIs when called at the end of an automation run. Its parameters include the requestor identifier, the array identifier and the automation state to be removed. This API may return true if the state is successfully removed for all CIs, false if not and an exception if an input is invalid. This API may not be called when lease time is specified as the removal time for the automation state is defined when added to the array of CIs with the parameter lease time.

I) Signature: registerAutomation( )

This API may be called at the very start of an automation run to register a non-automated user to make operational and automation state changes. It returns a globally unique identifier (GUID) that may be used as the requestor identifier in the state management APIs.

J) Signature: extendCIAutomationLeaseTime( )

This API allows a non-automated user to extend the lease time (when used) of a CI associated with the addition of a particular automation state. Its parameters are the requestor identifier (e.g., the GUID mentioned above), the system identifier of the CI, the lease time and the automation state to which the lease time is to be added. The lease time may be additional time or may be calculated from the initial addition of the automation state. This API returns an exception if an input is invalid.

K) Signature: unregisterAutomation( )

This API may be called at the very end of an automation run to unregister a non-automated user from making operational and automation state changes. Its parameter is a globally unique identifier (GUID) that was used as the requestor identifier in the state management APIs obtained using registerAutomation( ) at the beginning of the automation run. It returns true if successful and false if not. It may also return an exception if the requestor is not found.

In certain implementations, the state management APIs may be implemented in Jscript. Managing operational status and automation states of various CIs may be performed within a CMDB centrally instead of in a distributed manner. This is not necessary, however.

For example, some or all of the steps of FIG. 3 can be implemented by one or more Java classes with executable or human-readable code for performing some or all of the steps described above. The state management API may be located in an API layer above the CMDB and be located on one or more servers used to manage other servers in the cloud computing system, including but not limited to servers 150, 151, 160, 161. In one implementation, the one or more Java classes can be plugged into or connected to an instance or installation of the process applications to extend the application functionality to include the functionality of the state management APIs. In an implementation, functionality of the state management APIs may be accessed via a process application, for example, by using script calls stored in an associated database that are configured to invoke the desired functionality. In one example, the process application can be configured with a menu with an associated script or other functionality for accessing returns of any of the state management APIs.

According to the teachings herein, both operational status and automation states of CIs in a CMDB may be consistently managed by providing an API layer above the CMDB. This enables various users, such as monitoring, reliability engineering and operations engineering personnel to appropriately treat monitoring alerts coming from CIs that are in particular operational and/or automation states. The teachings herein also provide collision detection between multiple automations/manual operations that might be trying to occur simultaneously on the same set of CIs. By detecting these collisions, changes to the operational status or automation state of a CI may be avoided when the colliding operations are inconsistent with each other.

The implementations of the cloud computing infrastructure including clients 110, 111, 120, 121 and servers 150, 151, 160, 161 (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcontrollers, servers, microprocessors, digital signal processors or any other suitable circuit. In the claims, the term "processor" should be understood as encompassing any of the foregoing hardware, either singly or in combination.

Portions of clients 110, 111, 120, 121 and servers 150, 151, 160, 161 do not necessarily have to be implemented in the same manner. In one embodiment, clients 110, 111, 120, 121 and servers 150, 151, 160, 161 can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of computing devices as described herein (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably.

Further, in one aspect, for example, a computing device can be implemented using a general purpose computer or general purpose processor with a computer program that, when executed, carries out any of the respective methods, algorithms and/or instructions described herein. In addition or alternatively, for example, a special purpose computer/processor can be utilized which can contain other hardware for carrying out any of the methods, algorithms, or instructions described herein.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and may include RAM or other volatile memory or storage devices that may change over time.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method, comprising:
   determining, using a processor, whether a scheduled change that affects a configuration item and another change at least partially overlap in time using at least a configuration management database (CMDB) in a cloud computing infrastructure that includes the configuration item;
   responsive to a determination that the scheduled change and the other change at least partially overlap in time, determining, using the processor, whether the other change will affect the configuration item; and
   responsive to a determination that the other change will affect the configuration item, blocking, via the processor, at least one of the scheduled change and the other change using the processor.

2. The method of claim 1, comprising responsive to a determination that the scheduled change will not affect the configuration item or that the scheduled change and the other change do not at least partially overlap in time, implementing the scheduled change and the other change.

3. The method of claim 1, wherein affecting the configuration item comprises changing a related configuration item that affects the configuration item.

4. The method of claim 3, wherein the related configuration item comprises a router to which the configuration item is connected.

5. The method of claim 1, wherein determining whether the other change will affect the configuration item comprises:
   determining a state for the configuration item from the scheduled change; and
   determining whether the determined state conflicts with a current state of the configuration item due to the other change.

6. The method of claim 5, wherein the determined state comprises an operational state of the configuration item that indicates functionality of the configuration item.

7. The method of claim 6, wherein the operational state of a configuration item comprises:
   the configuration item is within normal operating parameters;
   the configuration item is in an error condition;
   the configuration item is under repair; or
   the configuration item is retired.

8. The method of claim 5, wherein the determined state comprises an automation state that indicates which operation is to be run on the configuration item for the scheduled change.

9. The method of claim 8, wherein the automation state comprises:
   the configuration item is to undergo a cloning process during the scheduled change;
   the configuration item is to undergo a renaming process during the scheduled change;
   the configuration item is to undergo a moving process during the scheduled change;
   the configuration item is to undergo a patching process during the scheduled change;
   the configuration item is to undergo a provisioning process during the scheduled change;
   the configuration item is to undergo a maintenance process during the scheduled change; or
   the configuration item is to undergo a retirement process during the scheduled change.

10. A system comprising:
    memory having instructions stored thereon; and
    one or more processors configured to execute the instructions to cause the one or more processors to:
       determine whether a first change will affect a configuration item using at least a configuration management database (CMDB) in a cloud computing infrastructure that includes the configuration item;
       determine whether a second change that will affect the configuration item at least partially overlaps the first change in time using at least the CMDB;
       responsive to a determination that the first and second changes will affect the configuration item and at least partially overlap in time, block at least one of the first change and the second change; and
       responsive to a determination that the first or second change will not affect the configuration item or that the first change and second change do not at least partially overlap in time, implement the first change and the second change.

11. The system of claim 10, wherein determining whether the first change will affect the configuration item comprises determining whether the first change will affect the configuration item directly or will affect another configuration item that would, in turn, affect the configuration item.

12. The system of claim 10, wherein the second change that will affect the configuration item will affect the configuration item directly or will affect another configuration item that would, in turn, affect the configuration item.

13. The system of claim 10, wherein the instructions are configured to cause the one or more processors to execute the instructions as part of a state management application programming interface.

14. The system of claim 10, comprising changing a state of the configuration item based at least in part on the first change or the second change.

15. The system of claim 14, wherein blocking the first change or the second change comprises cancelling an operation associated with the first change or the second change and reverting the state of the configuration item.

16. The system of claim 14, wherein implementing the first change or the second change comprises:
    completing an operation associated with the changed state; and
    upon completion of the operation, changing the state again.

17. The system of claim 10, wherein the first or second change is a scheduled change.

18. Tangible, non-transitory, and computer-readable medium having instructions stored thereon, wherein the instructions, when executed by one or more processors, are configured to cause the one or more processors to:
    determine whether a scheduled change that affects a configuration item and another change at least partially overlap in time using at least a configuration management database (CMDB) in a cloud computing infrastructure that includes the configuration item;
    responsive to a determination that the scheduled change and the other change at least partially overlap in time, determining whether the other change will affect the configuration item using at least the CMDB;
    responsive to a determination that the other change will affect the configuration item, blocking, via a state management application programming interface, the scheduled change or the other change using the processor; and
    responsive to a determination that the scheduled change will not affect the configuration item or that the scheduled change and the other change do not at least partially overlap in time, implementing the scheduled change and the other change.

19. The tangible, non-transitory, and computer-readable medium of claim 18, wherein determining whether the other change will affect the configuration item comprises:
    determining a state for the configuration item from the scheduled change; and
    determining whether the determined state conflicts with a current state of the configuration item due to the other change, and the current state comprises an automation state that indicates which operation is applied to the configuration item for the scheduled change, wherein determining whether the determined state conflicts with the current state comprises determining whether the determined state and the current state will change data corresponding to the configuration item.

20. The tangible, non-transitory, and computer-readable medium of claim 19, wherein the automation state comprises:
    the configuration item is currently undergoing a cloning process;
    the configuration item is currently undergoing a renaming process;
    the configuration item is currently undergoing a moving process;
    the configuration item is currently undergoing a patching process;

the configuration item is currently undergoing a provisioning process;
the configuration item is currently undergoing a maintenance process; or
the configuration item is currently undergoing a retirement process.

* * * * *